Nov. 28, 1939.  A. M. LEWIS ET AL  2,181,434
BUN WARMER
Filed Jan. 28, 1939  2 Sheets-Sheet 1
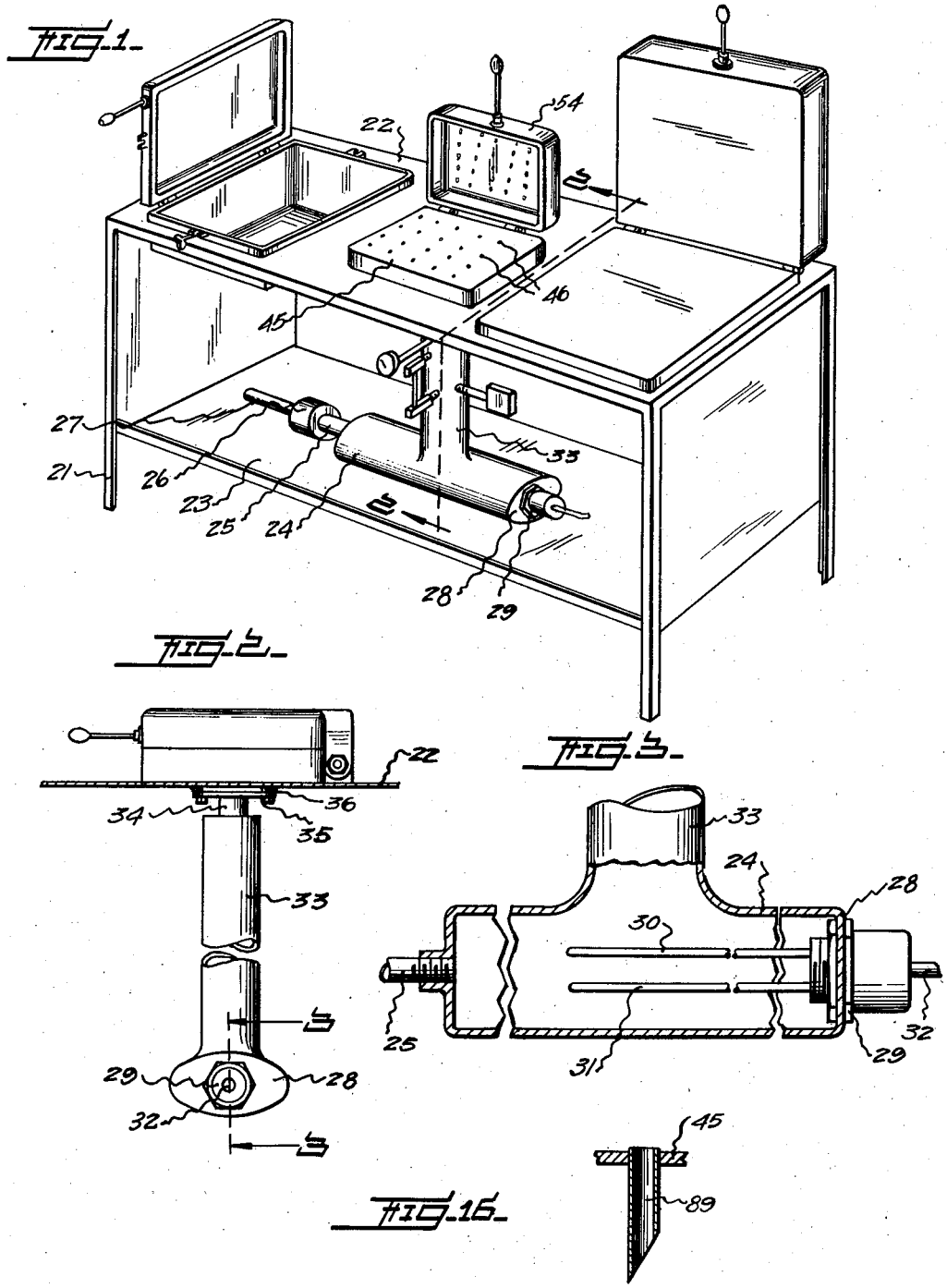
INVENTORS.
ALBERT M. LEWIS.
PETER B. WEILER.
BY
ATTORNEY.

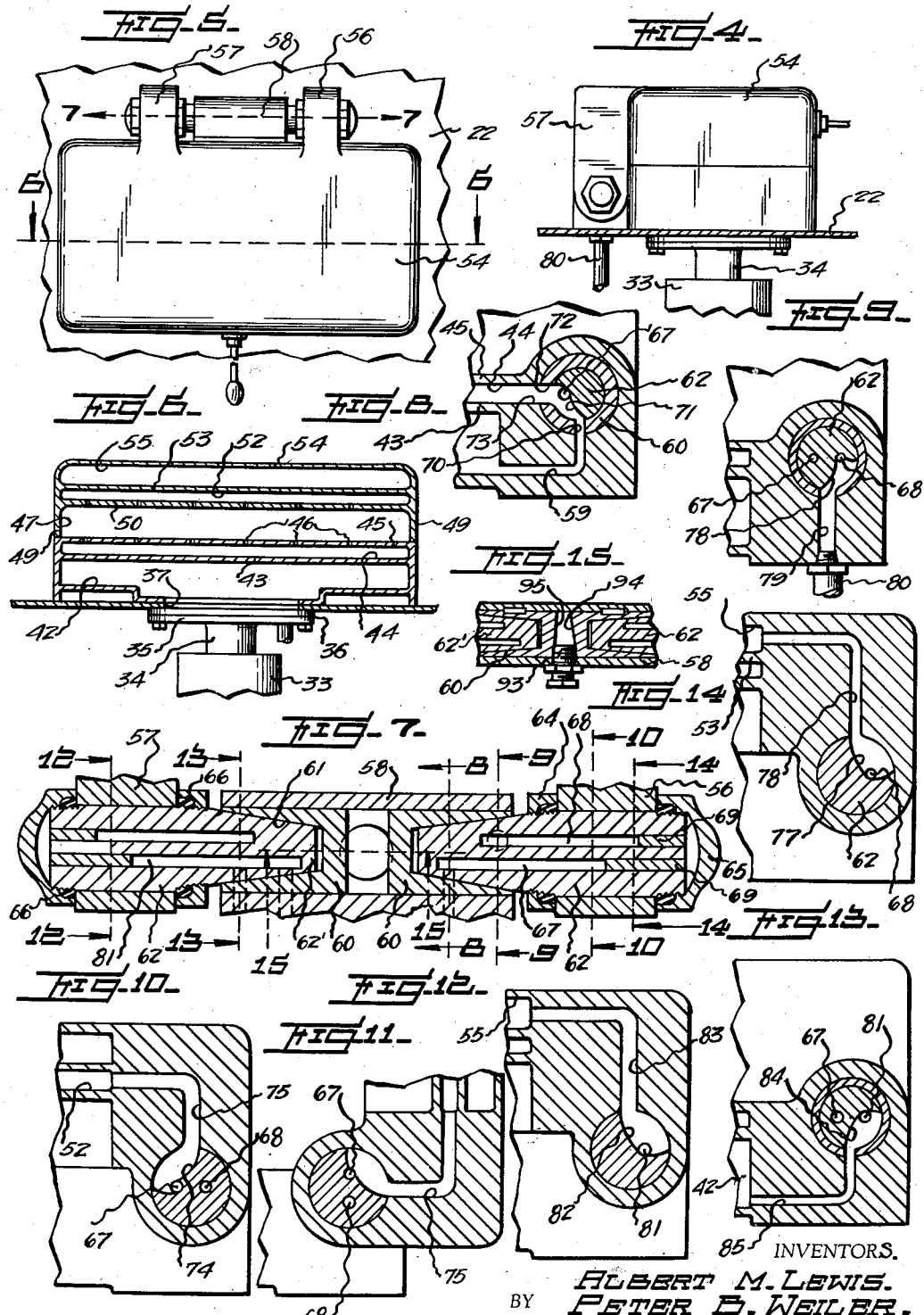

Patented Nov. 28, 1939

2,181,434

UNITED STATES PATENT OFFICE 2,181,434

BUN WARMER

Albert M. Lewis and Peter B. Weiler, Detroit, Mich.

Application January 28, 1939, Serial No. 253,267

12 Claims. (Cl. 53—2)

Our invention relates to a new and useful improvement in a bun warmer adapted for maintaining buns and the like in a warm condition by the use of steam, and it is an object of the present invention to provide a warmer of this class which may be steam operated and which will not permit the bun to become unduly moistened or soggy.

Another object of the present invention is the provision of a bun warmer so constructed and arranged that when the enclosing cover is moved to closing position, dry steam will be admitted to the bun containing compartment and the flow of steam to said compartment shut off immediately upon raising of the enclosing cover.

Another object of the present invention is the provision in a bun warmer of this class of penetrating means for penetrating a bun and delivering dry steam to the interior thereof for the purposes of warming the same and reconditioning it by restoring its normal moisture content should the bun become dried out.

Another object of the present invention is the provision of a bun warmer of this class so constructed and arranged that the condensate will be carried off as formed, and thus prevented from having contact with the bun to be warmed.

Another object of the present invention is the provision of a longitudinal construction of a steam mechanism for producing the necessary steam for heating purposes.

Other objects will appear hereinafter.

The invention consists in the arrangement and combination of parts hereinafter described and claimed.

The invention will be best understood by a reference to the accompanying drawings which form a part of this specification, and in which, Fig. 1 is a perspective view of the construction illustrating the present invention.

Fig. 2 is an end elevational view of a part of the invention taken on substantially line 2—2 of Fig. 1 with parts removed.

Fig. 3 is a fragmentary sectional view taken on line 3—3 of Fig. 2, slightly enlarged.

Fig. 4 is an end elevational view of the bun warmer.

Fig. 5 is a top plan view of the bun warmer.

Fig. 6 is a sectional view taken on line 6—6 of Fig. 4.

Fig. 7 is a sectional view taken on line 7—7 of Fig. 4, slightly enlarged.

Fig. 8 is a sectional view taken on line 8—8 of Fig. 7.

Fig. 9 is a sectional view taken on line 9—9 of Fig. 7.

Fig. 10 is a sectional view taken on line 10—10 of Fig. 7.

Fig. 11 is a view similar to Fig. 10 showing the cover in open position.

Fig. 12 is a sectional view taken on line 12—12 of Fig. 7.

Fig. 13 is a sectional view taken on line 13—13 of Fig. 7.

Fig. 14 is a sectional view taken on line 14—14 of Fig. 7.

Fig. 15 is a sectional view taken on line 15—15 of Fig. 7, slightly reduced.

Fig. 16 is a fragmentary sectional view showing a piercer used in the invention.

As shown in the drawings, the invention embodies a part of the construction comprising a table having legs 21 supporting a table top 22 spaced from a lower partition 23. Supported on the partition 23 is a boiler comprising the cross head 24 through one end wall of which extends a feed pipe 25 leading from a feed pump 26 which communicates inwardly of the pipe 27 with a suitable source of water supply. Secured on the opposite wall 28 of the cross head 24 is an electric fitting 29 carrying the tubes 30 and 31 in which are positioned electric heating elements connected by the cable 32 to a suitable source of electric energy. Extending upwardly from the cross head 24 centrally thereof is the stand pipe 33 which serves as a steam dome and which communicates at its upper end with the pipe 34, carrying the flange 35. This flange is bolted over the opening 37 formed in the table top 22, a suitable gasket 36 being positioned between the table top and the flange 35. The opening 37 in the table top registers with the opening 39 formed in the outwardly offset portion 39' of the bottom 40 of a housing, the end walls of which extend beyond the bottom 40 to provide the flange 41, this housing resting upon the table top 22. The bottom 40 forms with the partition 43 a compartment 42 and this partition 43 forms with the top 43 of the housing a compartment 44. The top 45 of the housing is provided with a plurality of openings 46 through which steam may escape. This steam escapes into the compartment 47 formed by the top 45 and the side walls 49 and the partition 50 of a cover which is swingably mounted upon the lower section or housing. A partition 53 cooperates with the partition 50 to form a compartment 52, the partition 50 having outlet openings 51 formed therein. The top 54 of the cover cooperates with the partition 50 to form a compartment 55.

Projecting outwardly from the cover at the rear side thereof are the spaced lugs 56 and 57 which form knuckles and also serve to function in operating a valve. Positioned between these lugs 56 and 57 is a knuckle 58 which projects rearwardly from the lower section. Fixedly mounted in the knuckle 58 are valve seat plugs 60, these valve plugs and cooperating parts being the same at opposite sides of the knuckle 58 so that a description of one will suffice for both. Formed in the plug is a conical pocket or socket 61 extending inwardly from one end. Projected through the knuckle 56 is a valve plug 62 having a tapered end 62' which engages in the socket 61 and serves to function as a valve plug therein. This plug 62 is provided with threaded portions on which are threaded the nuts 64 and 65, a gasket 66 being associated with each of these nuts for sealing purposes. Longitudinally extending passages 67 and 68 are formed in the plug 62, these passages being drilled inwardly from one end of the plug 62, and the end thereof being closed by a suitable closure 69. The passage 68 is shorter than the passage 67. The valve seat 60 is provided with an opening 70 with which communicates the passage 59 and at the location of this opening 70 the plug 62 is cut away as at 71. This cut-away portion registers with an opening 72 formed in the seat 60. The opening 72 is adapted to register with a passage 73 communicating with the compartment or chamber 44. The cover is swingably mounted, and as the cover is swung, the valve plug 62 moves in unison with it, so that the valve plug rotating in the seat portion 60 serves as the pivot on which the cover swings. When the cover is swung to closed position, the passage 59 will be in registration with the opening 70 and the cut-away portion will serve to communicate with this passage 70 through the opening 72 and passage 73 with the compartment 44. The construction is, therefore, such that when the cover is closed, steam is delivered to the compartments 42 and 44. The cut-away portion 71 is in communication with the passage 67 and steam passes through this passage 67 to the cut-away portion 74 which communicates with the passage 75 formed in the lug 56 or 57, as the case may be. This passage 75 communicates with the compartment or chamber 52 in the cover. Thus, when the cover is closed, steam is also delivered to the compartment 52. When the cover is swung into open position, the cut-away portion 71 is swung around so that communication of the same with the passage 59 is closed as shown in Fig. 11, and thus steam is no longer delivered to the passage 67.

The passage 68 is in communication through the cut-away portion 77 of the valve plug 62, and the passage 78 with the compartment 55. This passage 68 is also in communication through the cut-away portion 78 and the passage 79 with an outlet drain pipe 80. The passage 81 in the valve plug 62' is in communication through the cut-away portion 82 and the passage 83 with the compartment 55. This passage 81 is also in communication through the cut-away portion 84 and the passage 85 with the compartment 42 so that steam is delivered through the passage 85 and the passage 81 into the passage 83 and into the compartment 55 from which it passes through the passage 78 and the passage 68 to the passage 79 and the outlet drain pipe 80. Thus, when the cover is swung downwardly steam is delivered to the compartment 45 and circulated therethrough and drained outwardly through the pipe 80 so that there is a constant circulation of steam through this compartment 55. When this cover is swung upwardly there is no steam admitted to the compartments 52 and 44, but when the upper section is swung downwardly over the lower section, steam is admitted to these compartments and permitted to issue through the perforations formed in the partition 45 and the partition 50.

The structure may be termed a heating oven comprising an upper section and a lower section swingably mounted together and provided with the compartments referred to.

As shown in Fig. 15, we have provided an adjusting screw 93 which is adapted to be threaded into engagement with the inclined faces 94 and 95 of the seats 60 so that as the plug 62 and 62' wear, this wear may be compensated for.

In Fig. 16, we have shown a piercing member 89 which is a tapered, tubular member positioned in each of the openings 51' of the partition 50 corresponding to the partition 50' shown in Fig. 4. As the cover is lowered into steam-admitting position, these small needle-like tubular members penetrate the bun, so that the steam is injected into the interior of the bun. In this way, we have provided a simple and effective means for accomplishing the objects mentioned, and we have provided a mechanism whereby the bun may be warmed by means of steam, its moisture content restored, and at the same time any sogginess of the bun not permitted.

While we have illustrated and described the preferred form of construction, we do not wish to limit ourselves to the precise details of structure shown, but desire to avail ourselves of such variations and modifications as may come within the scope of the appended claims.

What we claim as new is:

1. In a device of the class described, comprising: an oven having a lower section and an upper section, said upper section being swingably mounted on said lower section, said upper section forming with said lower section a heating compartment; a steam compartment in said lower section; the top of the said lower section having openings formed therethrough communicating with said heating compartment; means for delivering steam into said steam compartment; a partition separating said steam compartment from the top of said lower section and forming therewith an auxiliary steam compartment; means for conducting steam into said auxiliary steam compartment; and control means for controlling the delivery of steam into said auxiliary steam compartment movable into open position upon the swinging of said upper section on to said lower section and movable into closed position upon the swinging of said upper section away from said lower section.

2. In a device of the class described, comprising: an oven having an upper section and a lower section; means for swingably connecting said sections together, said upper section being swingable downwardly upon the said lower section and adapted for forming therewith a heating compartment, the top of said lower section forming the bottom of said compartment; a perforated partition set inwardly from the edges of said section and forming the top of said compartment; the top of said lower section being perforated; a partition in said lower section in spaced relation to the top thereof to provide a steam compartment; a partition in said upper section in spaced relation to said perforated partition to provide therewith a steam compartment; means for delivering steam to each of said compartments; control means for controlling the delivery of steam to said compartments and adapted upon the swinging of said upper section on to said lower section for moving to open position and upon the upward swinging of said upper section relatively to said lower section for moving to closed position.

3. In a device of the class described, comprising: an oven having an upper section and a lower section; means for swingably connecting said sections together, said upper section being swingable downwardly upon the said lower section and adapted for forming therewith a heating compartment, the top of said lower section forming the bottom of said compartment; a perforated partition set inwardly from the edges of said section and forming the top of said compartment, the top of said lower section being perforated; a partition in said lower section in spaced relation to the top thereof to provide a steam compartment; a partition in said upper section in spaced relation to said perforated partition to provide therewith a steam compartment; means for delivering steam to each of said compartments; control means for controlling the delivery of steam to said compartments and adapted upon the swinging of said upper section on to said lower section for moving to open position and upon the upward swinging of said upper section relatively to said lower section for moving to closed position, there being a drain conduit communicable with the steam compartment in said lower section; and means for establishing communication of said conduit with said steam compartment in said lower section upon the upward swinging of said upper section relatively to said lower section.

4. In a device of the class described, comprising: an oven embodying an upper section and a lower section; means for swingably connecting said sections together, said upper section being swingable over and upon said lower section; a perforated partition positioned in said upper section and set inwardly from the edges thereof to provide with the top of said lower section a heating compartment, said top being perforated; a partition positioned in said lower section in spaced relation from its top to provide therewith a steam chamber; a partition positioned in said upper section in spaced relation to said perforated partition to provide therewith a steam chamber; means for delivering steam into each of said chambers; and means operable upon the swinging of said upper section away from said lower section for shutting off the supply of steam to said chambers.

5. In a device of the class described, comprising: an oven embodying an upper section and a lower section; means for swingably connecting said sections together, said upper section being swingable over and upon said lower section; a perforated partition positioned in said upper section and set inwardly from the edges thereof to provide with the top of said lower section a heating compartment, said top being perforated; a partition positioned in said lower section in spaced relation from its top to provide therewith a steam chamber, a partition positioned in said upper section in spaced relation to said perforated partition to provide therewith a steam chamber; means for delivering steam into each of said chambers; and means operable upon the swinging of said upper section away from said lower section for shutting off the supply of steam to said chambers; an auxiliary steam chamber in said lower section positioned below the partition therein; and means for delivering steam into said additional chamber.

6. In a device of the class described, comprising: an oven embodying an upper section and a lower section; means for swingably connecting said sections together, said upper section being swingable over and upon said lower section; a perforated partition positioned in said upper section and set inwardly from the edges thereof to provide with the top of said lower section a heating compartment, said top being perforated; a partition positioned in said lower section in spaced relation from its top to provide therewith a steam chamber, a partition positioned in said upper section in spaced relation to said perforated partition to provide therewith a steam chamber; means for delivering steam into each of said chambers; and means operable upon the swinging of said upper section away from said lower section for shutting off the supply of steam to said chambers; an auxiliary steam chamber in said lower section positioned below the partition therein; and means for delivering steam into said additional chamber; a steam chamber in said upper section formed by the top and by one of said partitions; and means for delivering steam into said chamber.

7. In a device of the class described, comprising: an oven embodying an upper section and a lower section; means for swingably connecting said sections together with said upper section being swingable over and upon said lower section; a perforated partition set inwardly from the edges of said upper section; a non-perforated partition in said upper section between said perforated partition and the top of said upper section to provide with the said top an upper steam chamber and to provide with said perforated partition a lower steam chamber; means for delivering steam into each of said steam chambers; control means for controlling the delivering of steam into said steam chambers; and means for operating said control means upon the swinging of said upper section relatively to said lower section.

8. In a device of the class described, comprising: an oven embodying an upper section and a lower section; means for swingably connecting said sections together with said upper section being swingable over and upon said lower section; a perforated partition set inwardly from the edges of said upper section; a non-perforated partition in said upper section between said perforated partition and the top of said upper section to provide with the said top an upper steam chamber and to provide with said perforated partition a lower steam chamber; means for delivering steam into each of said steam chambers; control means for controlling the delivering of steam into said steam chambers; and means for operating said control means upon the swinging of said upper section relatively to said lower section; and means for establishing a drain conduit with said upper steam chamber upon the upward swinging of said upper section relatively to said lower section.

9. In a device of the class described, comprising: an oven embodying an upper section and lower section; means for swingably mounting said sections together, said upper section being swingable over and upon said lower sections, the top of said lower section being perforated; a partition positioned between the top and the bottom of said lower section to provide an upper steam chamber and a lower steam chamber; means for controlling the delivery of steam into said lower steam chamber constantly; means for delivering steam into said upper steam chamber; means for controlling the delivery of steam into said upper steam chamber; and means for operating said control means upon the swinging of said upper section relatively to said lower section.

10. In a device of the class described, comprising: an oven having a pair of steam chambers; a hinge mechanism for swingably mounting said steam chambers together; means for delivering steam to said hinge mechanism; means operable upon the swinging of said sections into one position for establishing communication of said chambers with said delivery means and upon the swinging of said sections to another relative position for closing communication between said steam delivery means and said steam chambers.

11. In a device of the class described, comprising: an oven having a pair of steam chambers; a hinge mechanism for swingably mounting said steam chambers together; means for delivering steam to said hinge mechanism; means operable upon the swinging of said sections into one position for establishing communication of said chambers with said delivery means and upon the swinging of said sections to another relative position for closing communication between said steam delivery means and said steam chambers; a drain conduit communicating with said hinge mechanism; and means for establishing communication of said drain conduit with one of said steam chambers upon the swinging of the same to a predetermined relative position.

12. In a device of the class described, comprising: an oven embodying a pair of sections; means for swingably mounting said sections together, the upper section swinging over and upon the lower section and forming therewith a heating compartment; means for delivering steam into said compartment; and perforating means carried by one of said sections for perforating an article in said compartment and conducting steam into the interior thereof.

ALBERT M. LEWIS.
PETER B. WEILER.